May 28, 1968  R. S. FARR ET AL  3,385,037
INERTIAL AIR CLEANER
Filed Feb. 10, 1966  2 Sheets-Sheet 1
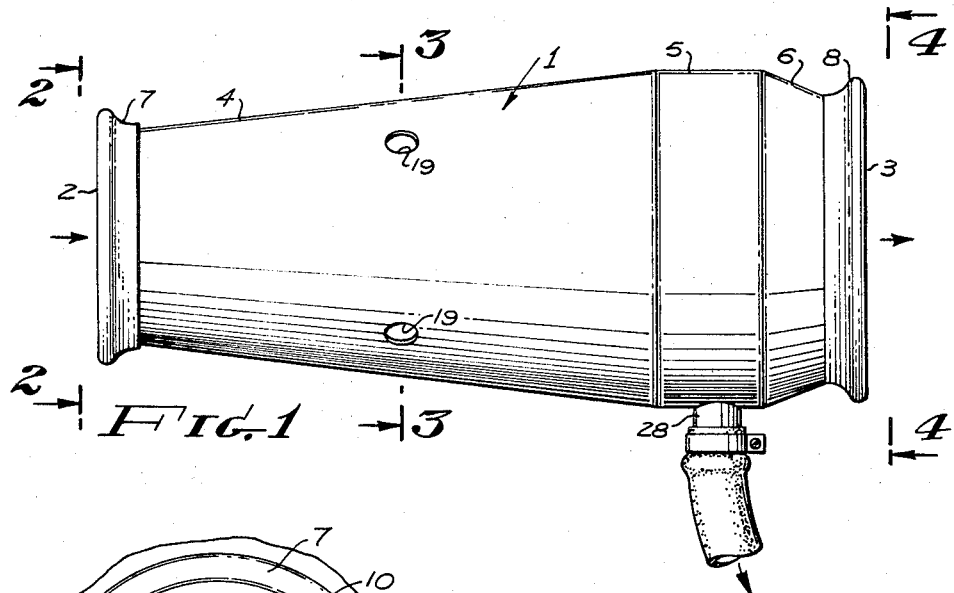
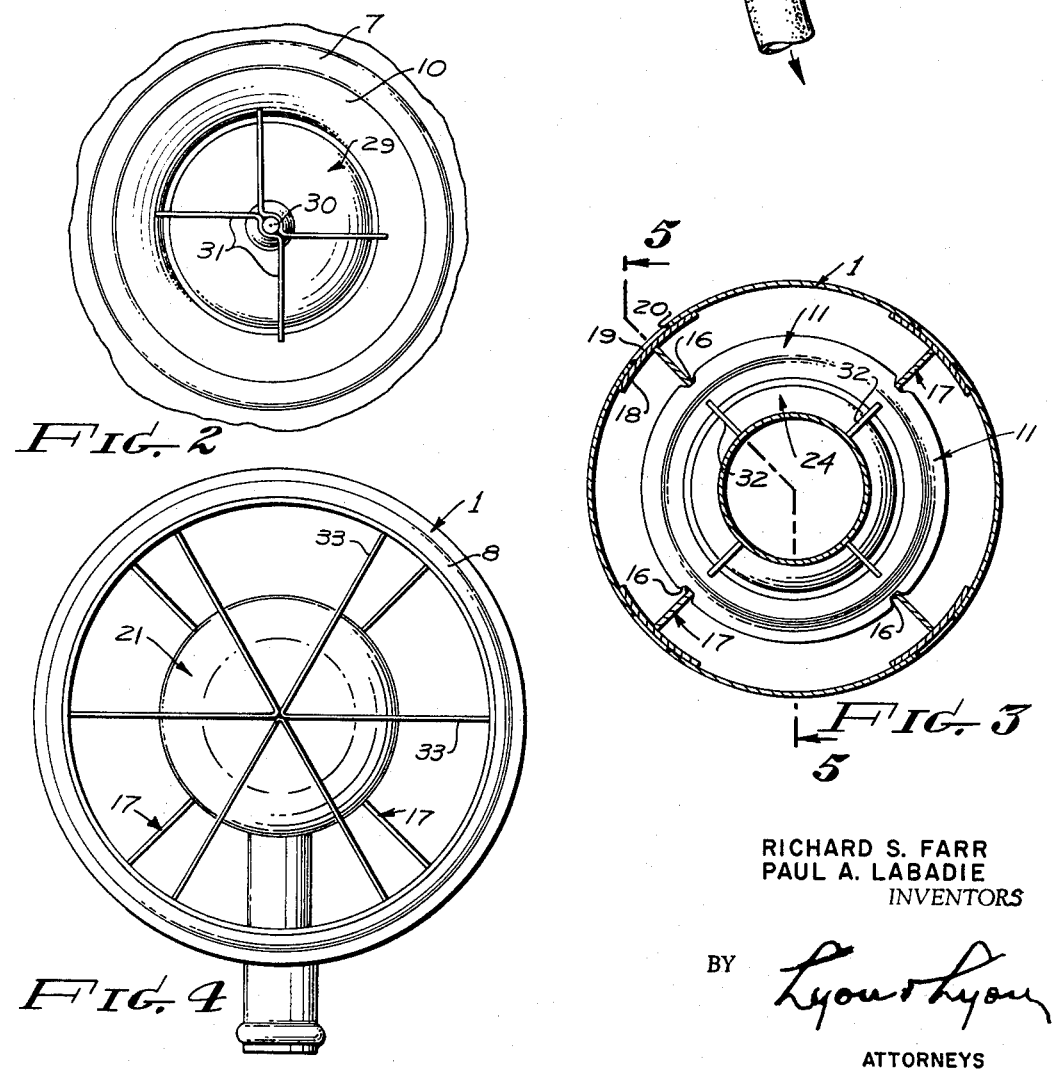
RICHARD S. FARR
PAUL A. LABADIE
INVENTORS
BY  *Lyon & Lyon*
ATTORNEYS

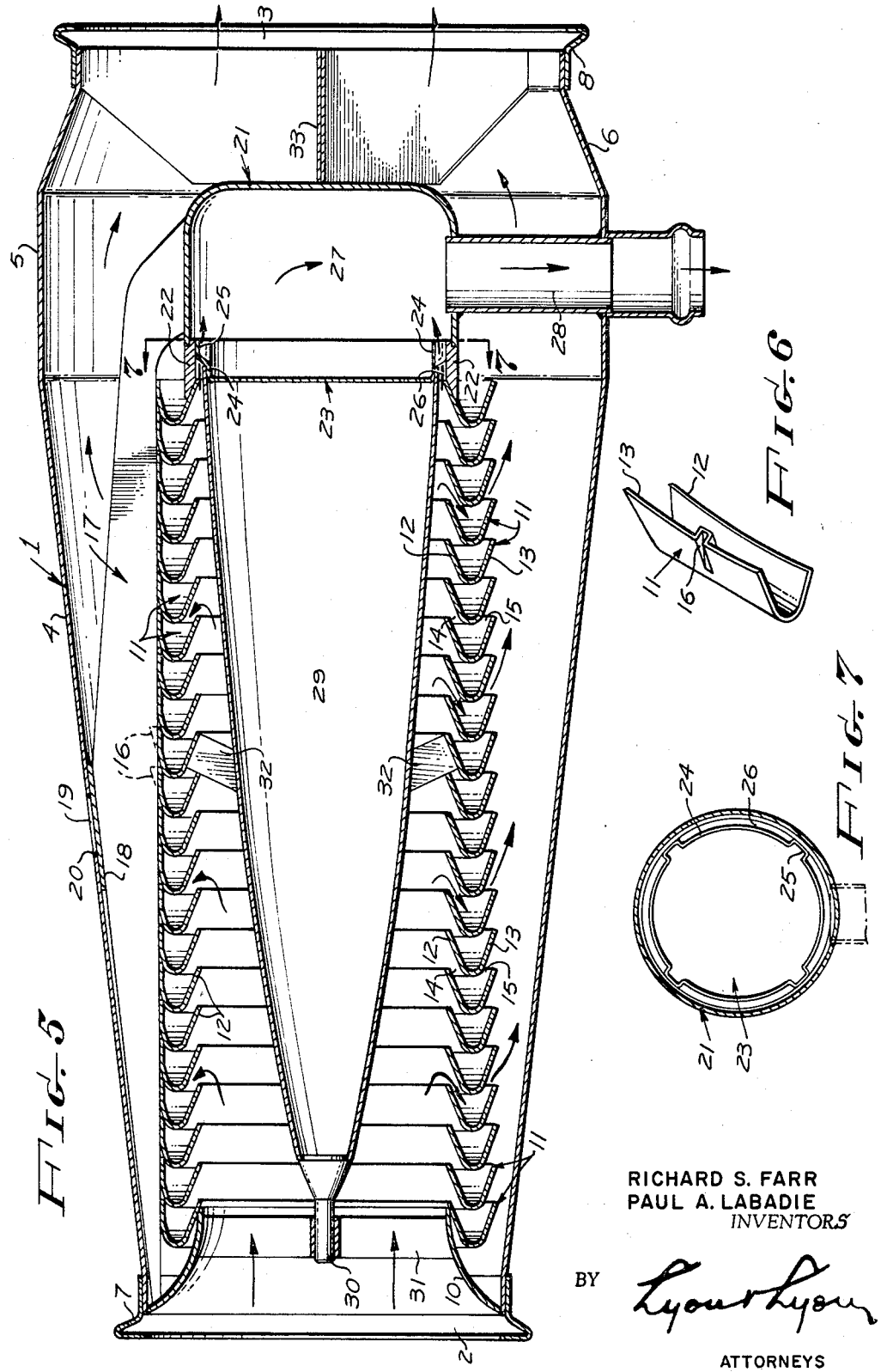

United States Patent Office 3,385,037
Patented May 28, 1968

3,385,037
INERTIAL AIR CLEANER
Richard S. Farr, Los Angeles, and Paul A. Labadie, Redondo Beach, Calif., assignors to Farr Company, El Segundo, Calif., a corporation of California
Filed Feb. 10, 1966, Ser. No. 526,515
4 Claims. (Cl. 55—443)

ABSTRACT OF THE DISCLOSURE

An air cleaner of the inertial separating type having an elongated housing with the inlet and outlet axially spaced and aligned with a series of annular baffles between the inlet and outlet and forming passageways between baffles causing the air flow to first be reversed in a direction toward the inlet and then directed toward the outlet and, at the base of the baffles away from the inlet, a collecting chamber having an opening facing the inlet for receiving the inertially separated particulate matter with an outlet from the chamber to exteriorly of the device. A core positioned interiorly of the baffles continually decreases the flow area from the inlet toward the base of the baffles and exteriorly of the baffles the passage to the outlet continually increases in size.

---

This invention relates to inertial air cleaners; that is, to air cleaners wherein particulate matter is separated from an air stream by utilizing the greater mass and hence inertia of particulate matter contained in a moving mass of air.

A primary object is to provide an inertial air cleaner wherein the air intake and outlet as well as the chamber into which the particulate matter is delivered, are coaxial, and which insures maximum separation, even though the particulate matter is finely divided.

A further object is to provide an inertial air cleaner which incorporates novelly arranged annular baffle elements and a central deflector wherein the peripheral portions of the air column are progressively deflected in a folded path; that is, the air is caused to flow rearwardly and outwardly, then forwardly and outwardly to form a second concentric annular air column moving in the same direction as the initial column while causing the particulate matter to continue in the residual portions of the initial air column. Simultaneously, the deflector gradually expands so as to maintain the residual air column at an essentially uniform velocity and concentrate the particulate matter in a narrow annular ring of air which is delivered to a chamber for removal.

A further object is to provide an inertial air cleaner wherein the series of baffle elements define a cylindrical wall and the deflector is so contoured that the velocity of the initial air column remains constant.

A still further object is to provide an inertial air cleaner which incorporates a novel support for the baffle elements, the support firmly securing the baffle elements against the forces incident to high velocity air flow, vibration and shock.

Other and more detailed objects and advantages of this invention will appear from the following description in the accompanying drawings.

In the drawings:

FIGURE 1 is a side view of the inertial air cleaner showing fragmentarily its connections to an air duct.

FIGURE 2 is an end view taken from 2—2 of FIGURE 1 with the shell of the cleaner indicated fragmentarily.

FIGURE 3 is a sectional view taken through 3—3 of FIGURE 1.

FIGURE 4 is an end view taken from 4—4 of FIGURE 1.

FIGURE 5 is an enlarged longitudinal sectional view of the inertial air cleaner taken through 5—5 of FIGURE 3.

FIGURE 6 is a fragmentary perspective view of one of the baffle elements.

FIGURE 7 is a reduced transverse sectional view taken through 7—7 of FIGURE 5.

The inertial air cleaner includes a tubular shell 1 having an inlet 2 and an outlet 3 disposed in coaxial relation. Beginning at the inlet 2, the shell 1 is provided with an elongated conical section 4 which is joined to a short cylindrical section 5 and which in turn is joined to a short conical section 6 terminating at the outlet 3. The inlet end is provided with a flange 7 and the outlet end is provided with a similar flange 8 for connection to mating flanges on adjoining sections of an air duct.

The inlet end 2 is provided with an entrance nozzle 10 which diminishes in diameter in a downstream direction. Continuing from the entrance nozzle is a series of baffle elements 11.

Each baffle element is in the form of a ring having an inner lip 12 of approximately the same diameter as the discharge end of the entrance nozzle 10 and an outer lip 13. The two lips are directed downstream and define therebetween an annular V-channel. The baffle elements are nested so that the inner lips of adjacent baffle elements form upstream directed entrance slots 14 and downstream directed exit slots 15.

The outer lip of each baffle element is provided with several inwardly folded grooves 16 as shown best in FIGURE 6. The grooves provided in the series of baffle elements are disposed in axial alignment and receive mounting ribs 17 which are welded to the baffle elements. In the construction illustrated, four mounting ribs 17 are provided. Each mounting rib is provided at its mid-portion with a plate 18 conforming to the shell 1.

The shell 1 is provided in centered relation with each plate 18 with a hole 19 exposing the central portion of each plate. The plates are joined to the shell 1 at the periphery of each hole by a weld 20. The mounting ribs 17 extend upstream to the inlet end of the shell and are welded thereto.

The mounting ribs 17 also extend downstream from the plates 18, curve inwardly, and are welded to a cup-shaped cap 21, centered in the cylindrical section 5 of the shell. The open end of the cap 21 is directed upstream and is provided with an annular rim 22 which is joined to the final or downstream baffle element 11.

Fitted in the upstream or open end of the cap 21 is a disk 23 having a peripheral rim 24 in which is formed several ribs 25 which are welded to the rim 22 of the cap 21. The two rims 22 and 24 define therebetween an annular slit 26 interrupted by the ribs 25. The annular slit forms an inlet to a chamber 27 defined by the cap 21. The chamber 27 is provided with a side outlet 28 extending through the shell 1.

A deflecting core 29 extends upstream from the disk 23 and diminishes in diameter. The upstream end of the core terminates in a stem 30 which is supported by webs 31 within the entrance nozzle 10. The walls of the core 29 are curved to define a paraboloid or an approximation of a paraboloid.

One or more sets of radiating webs 32 extend between selected baffle elements 11 and the core to reinforce the core and the set of baffle elements and to minimize vibration.

The cap 21 is firmly secured in place by a set of webs 33 extending between the closed or downstream end of the cap and the outlet 3 of the shell.

Operation of the inertial air cleaner is as follows:

An air column guided by the duct which precedes the air cleaner flows at high velocity into the annular space defined by the baffle elements 11 and the core 29. The outer peripheral portion of the air column is progressively diverted by the baffle elements. The air is first diverted in an upstream direction as it passes through the entrance slots 14 and then is re-diverted in a downstream direction as it passes through the exit slots 15.

The downstream expanding core 29 crowds the air column radially outward. The spacing between the core 29 and successive baffle elements 11 is so calculated that the air velocity within the thus defined annular space remains substantially constant. More specifically, the core preferably increases in diameter so that the following relationship is maintained:

where:

$$d = \sqrt{\frac{X}{L}} D$$

$d$=the diameter of the core at any distance X from the leading or upstream end of the core
$D$=the diameter at the large or downstream end of the core
$L$=the overall length of the core Particulate matter, when entrained in the air column, has much greater mass than the air particles, even though the particulate matter may be of extremely small dimension. Consequently, the particulate matter does not follow the peripheral portions of the air column as they are progressively diverted and rapidly changed in direction of flow in order to enter the entrance slots 14. The particulate matter continues to flow axially to the downstream end of the series of baffle elements and enters the slit 26 along with a relatively small residual quantity of air. The smaller the area of the slit 26, the higher the velocity of residual air, which in effect, increases the efficiency of the air cleaner. Thus, the slit 26 is made as small as the allowable pressure loss for the bleed system connected to the side outlet 28 permits.

The particulate matter which may strike the core 29 is deflected along the walls of the core and also enters the slit 26. Due to the conical section 4 located radially outward from the series of baffle elements 11, the velocity of air discharge from the exit slots 15 does not increase. In fact, the rate of increase in diameter of the shell is such that the air velocity outside the series of baffle elements and externally of the cap 21, may decrease in velocity. In effect the conical section 4 and core 29 combine to form an annular shaped tubular housing with the annular space therebetween being of a relatively constant or at least non-decreasing cross-sectional area from the inlet to the outlet and with the annular baffles 11 positioned in that annular space such that when progressing from the inlet to the outlet the space interiorly of the baffles continually decreases while the space exteriorly of the baffles continually increases.

The outlet end of the shell and duct into which it discharges are preferably somewhat larger than the orifice defined by the entrance ring 10, so that the air velocity downstream from the air cleaner is reduced.

Having fully described our invention, it is to be understood that we do not wish to be limited to the details herein set forth or to the details illustrated in the drawings, but our invention is of the full scope of the appended claims.

We claim:
1. An inertial air cleaner, comprising:
   (a) a shell having an inlet and an outlet disposed in coaxial relation, said shell increasing in diameter to a region near said outlet, then decreasing in diameter to said outlet;
   (b) means defining a receiving chamber for particulate matter located in said shell at the region of greater diameter and forming therewith an annular passage at least equal to the area of said inlet, said means having a lateral discharge duct extending through said shell, said chamber having an annular inlet slit facing toward the inlet end of said shell;
   (c) a series of baffle elements extending between said shell inlet and said chamber inlet slit, each of said baffle elements having radially inner and radially outer annular lips directed downstream, said baffle elements being nested to form therebetween flow passages which cause air flowing into said series of baffle elements from said inlet to be diverted in an upstream direction, then re-diverted in a downstream direction for discharge through said outlet;
   (d) the outer lips of said baffle elements having a plurality of axially directed grooves;
   (e) a plurality of ribs secured to said baffle elements at said grooves, each rib having a plate bearing against the wall of said shell, said shell having openings exposing said plates, said plates being secured to said shell at the margins of said openings;
   (f) and a core extending within said baffle elements between the inlet of said shell and the inlet slit of said chamber for guiding residual air and particulate matter into said chamber.

2. An inertial air cleaner comprising; an elongated tubular housing having a spaced coaxial inlet and outlet and having a cross-sectional flow area of a non-decreasing magnitude therealong from the inlet to the outlet, a series of annular baffles mounted in axial alignment in said tubular housing and extending from said inlet to near said outlet across said flow area with the flow area on the side of said baffles open to said inlet continually and relatively uniformly decreasing in the direction toward said outlet, each baffle having inlet and outlet lip portions both extending generally in the direction toward the outlet and in nesting relation with adjacent baffles to form passageways between baffles which cause air flowing into said series of baffles from said inlet to be diverted upstream and then rediverted downstream for discharge through said outlet, a plurality of axially extending ribs connected to the exterior of said baffles and joined to the surrounding tubular housing to support said baffles in said axial alignment, means defining a collecting chamber at the end of said series of baffles near said outlet and having a small opening on the inlet side of said baffles facing toward said inlet for receiving particulate matter, and an outlet from said collecting chamber means to exteriorly of said housing for discharging such particulate matter.

3. The inertial air cleaner of claim 2 wherein said series of annular baffles are of substantially the same diameter to form a cylindrical assemblage, and said tubular housing is comprised of a central core and surrounding shell each having wall means diverging at a small angle toward the outlet to form an annular space between said core and shell wall means comprising the said non-decreasing cross-sectional flow area within which said series of baffles is positioned.

4. The inertial air cleaner of claim 3 wherein the said wall means of said core and shell diverge in a relatively parallel manner with the radial distance therebetween remaining relatively the same whereby the cross-sectional flow area in said annular space increases in the direction toward said outlet.

References Cited

UNITED STATES PATENTS

| 1,581,220 | 4/1926 | Mir _____ | 55—442 |
| 2,506,273 | 5/1950 | Linderoth _____ | 55—444 |
| 2,712,858 | 7/1955 | Wintermute _____ | 55—443 |
| 3,190,058 | 6/1965 | Farr et al. _____ | 55—498 |

FOREIGN PATENTS

| 302,973 | 1/1918 | Germany. |
| 929,443 | 1/1963 | Great Britain. |
| 55,928  | 4/1911 | Switzerland. |

HARRY B. THORNTON, *Primary Examiner.*

B. NOZICK, *Assistant Examiner.*